US007221335B2

(12) United States Patent
Jeong

(10) Patent No.: US 7,221,335 B2
(45) Date of Patent: May 22, 2007

(54) IMAGE DISPLAY METHOD AND DEVICE FOR PLASMA DISPLAY PANEL

(75) Inventor: Jae-Seok Jeong, Cheonan (KR)

(73) Assignee: Samsung SDI Co., Ltd, Suwon-si (KR)

( * ) Notice: Subject to any disclaimer, the term of this patent is extended or adjusted under 35 U.S.C. 154(b) by 494 days.

(21) Appl. No.: 10/781,132

(22) Filed: Feb. 17, 2004

(65) Prior Publication Data

US 2004/0164934 A1 Aug. 26, 2004

(30) Foreign Application Priority Data

Feb. 18, 2003 (KR) ...................... 10-2003-0010072
Jul. 30, 2003 (KR) ...................... 10-2003-0052601

(51) Int. Cl.
*G09G 3/28* (2006.01)
*G09G 3/10* (2006.01)
*H04N 5/14* (2006.01)
*H04N 5/57* (2006.01)

(52) U.S. Cl. ..................... 345/63; 345/690; 315/169.1; 348/671; 348/687

(58) Field of Classification Search ............ 345/60–68, 345/690–692; 315/169.1–169.4; 348/671, 348/687, 910
See application file for complete search history.

(56) References Cited

U.S. PATENT DOCUMENTS 5,818,419 A * 10/1998 Tajima et al. ............... 345/691
6,552,701 B1 * 4/2003 Tanaka ......................... 345/63
6,714,250 B1 * 3/2004 Correa et al. ............... 348/447
7,057,584 B2 * 6/2006 Jeong ........................... 345/60
7,139,007 B1 * 11/2006 Kawahara ................... 345/690
2002/0097201 A1 * 7/2002 Yamamoto et al. ........... 345/60

FOREIGN PATENT DOCUMENTS

EP 0 982 707 A1 3/2000
EP 1 233 395 A1 8/2002
EP 1 265 212 A1 12/2002
JP 2002-221934 8/2002
KR 2000-0016955 3/2000

OTHER PUBLICATIONS

Patent Abstracts of Japan for Publication No. 2002-221934, date of publication of Aug. 9, 2002, in the name of A. Yamamoto et al.
H. Kuriyama et al, “50-Hz Flicker Reduction for PDP and Evaluation System Development”, 2001 SID International Symposium Digest of Technical Papers, Jun. 2001, vol. 32, pp. 1102-1105.
European Search Report for Application No. 04090052.4, dated Dec. 20, 2004, in the name of Samsung SDI Co., Ltd.
Korean Patent Abstract, Publication No. 1020000016955, Published on Mar. 25, 2000, in the name of Corea, et al.

* cited by examiner

*Primary Examiner*—Henry N. Tran
(74) *Attorney, Agent, or Firm*—Christie, Parker & Hale, LLP

(57) ABSTRACT

Disclosed is a PDP image display method and device for dividing an image of each frame displayed on a PDP corresponding to an input video signal into subfields, each subfield corresponding to a bit that represents one of a plurality of luminance weights, combining luminance weights of the subfields, and displaying gray. The subfields include first and second subfield groups. A number of the subfields included in the second subfield group is greater than a number of the subfields included in the first subfield group. At least one of the subfields, which is used for forming low gray, is included in the second subfield group, and a start point of the second subfield group is varied according to a load ratio of the input video signal.

20 Claims, 12 Drawing Sheets

FIG.2(Prior Art)

| Subfield | SF1 | SF2 | SF3 | SF4 | SF5 | SF6 | SF7 | | SF1 | SF2 | SF3 | SF4 | SF5 | SF6 | SF7 | |
|---|---|---|---|---|---|---|---|---|---|---|---|---|---|---|---|---|
| Gray / Weight | 1 | 4 | 8 | 16 | 24 | 32 | 40 | Suspension interval | 2 | 4 | 8 | 16 | 24 | 32 | 40 | Suspension interval |
| 0 | | | | | | | | | | | | | | | | |
| 1 | O | | | | | | | | | | | | | | | |
| 2 | | | | | | | | | O | | | | | | | |
| 3 | O | | | | | | | | O | | | | | | | |
| 4 | | | | | | | | | | O | | | | | | |
| 5 | O | | | | | | | | | O | | | | | | |
| 6 | | O | | | | | | | O | | | | | | | |
| 7 | O | O | | | | | | | O | | | | | | | |
| 8 | | O | | | | | | | | O | | | | | | |
| 9 | O | O | | | | | | | | O | | | | | | |
| 10 | | O | | | | | | | O | O | | | | | | |
| 11 | O | O | | | | | | | O | O | | | | | | |
| | G1 | | | | | | | | G2 | | | | | | | |

FIG.6

| Subfield | SF1 | SF2 | SF3 | SF4 | SF5 | SF6 | | SF1 | SF2 | SF3 | SF4 | SF5 | SF6 | SF7 | SF8 | |
|---|---|---|---|---|---|---|---|---|---|---|---|---|---|---|---|---|
| Gray \ Weight | 4 | 8 | 16 | 24 | 32 | 40 | Suspension interval | 1 | 2 | 4 | 8 | 16 | 24 | 32 | 40 | Suspension interval |
| 0 | | | | | | | | | | | | | | | | |
| 1 | | | | | | | | ○ | | | | | | | | |
| 2 | | | | | | | | | ○ | | | | | | | |
| 3 | | | | | | | | ○ | ○ | | | | | | | |
| 4 | | | | | | | | | | ○ | | | | | | |
| 5 | | | | | | | | ○ | | ○ | | | | | | |
| 6 | | | | | | | | | ○ | ○ | | | | | | |
| 7 | | | | | | | | ○ | ○ | ○ | | | | | | |
| 8 | ○ | | | | | | | | | ○ | | | | | | |
| 9 | ○ | | | | | | | ○ | | ○ | | | | | | |
| 10 | ○ | | | | | | | | ○ | ○ | | | | | | |
| 11 | ○ | | | | | | | ○ | ○ | ○ | | | | | | |
| | G1 | | | | | | | G2 | | | | | | | | |

IMAGE DISPLAY METHOD AND DEVICE FOR PLASMA DISPLAY PANEL

CROSS REFERENCE TO RELATED APPLICATION

This application claims priority to and the benefit of Korean Patent Applications No. 2003-10072 filed on Feb. 18, 2003 and No. 2003-52601 filed on Jul. 30, 2003 in the Korean Intellectual Property Office, the contents of both of which are incorporated herein by reference.

BACKGROUND OF THE INVENTION

1. Field of the Invention

The present invention relates to an image display method and device for a plasma display panel (PDP). More specifically, the present invention relates to a PDP image display method and device for reducing flicker and dynamic false contour (DFC) generated when inputting 50 Hz PAL (phase alternating by line) video signals to realize images.

2. Description of the Related Art

A PDP is a display device for restoring image data input as electrical signals by arranging a plurality of discharge cells in a matrix pattern and selectively allowing the discharge cells to emit light.

Gray displaying is needed so that the PDP may operate as a color display device, and a gray realization method for dividing a single field into a plurality of subfields and performing time-division control on the subfields is used to realize the gray display.

Flickers are closely related to the quality of images perceived by humans, as flickers tend to degrade the quality of human visual experience. The flickers are more frequently detected by human eyes as a screen becomes bigger or a frequency lowers.

When images generated using PAL video signals are displayed on a large PDP, both of the above-noted conditions are met, thereby causing a lot of flickers. Therefore, when the PDP is driven at 50 Hz using a minimum incremental arrangement or a minimum decrement arrangement which is a general arrangement of subfields used for the PDP, a lot of flickers are generated.

Since the screen cannot be controlled in the above-noted two conditions that cause flicker, a method for controlling the frequency is used to reduce the flicker.

Korean published application No. 2000-16955 discloses a conventional method for reducing flicker generation by control of the frequency. In order to reduce large screen flickers generated when inputting 50 Hz video signals to drive a PDP, subfields in a single frame are divided into two groups G1 and G2, and the subfields of the groups except the least significant bit (LSB) subfield are established to have the same configuration. In other words, luminance weights are similarly allocated to the subfields of the respective groups, as shown in FIG. 1. The above-described method is much more effective than the conventional subfield arrangement, such as the minimum incremental arrangement or the minimum decrement arrangement.

Referring to FIG. 1, a total interval of a single frame is 20 ms, and the intervals of the respective groups G1 and G2 are fixed as 10 ms. Two suspension intervals are provided, one of which is positioned at the end of the frame, that is, at the end of the second group G2, and the other of which is positioned between the two groups G1 and G2, that is, at the end of the first group G1.

FIG. 2, for example, shows a partial realization of low gray by using a conventional subfield arrangement.

As shown, in the case of displaying low gray such as a low gray of from 0 to 11 by using a conventional subfield arrangement, a time difference between the subfields corresponding to the LSB and the LSB+1 is several ms.

For example, in the case of low gray 3, the lowest subfield SF1 of the first group G1 is turned on, and the lowest subfield SF1 of the second group G2 is turned on. In this instance, the subfield of the first group G1 is a subfield of the LSB, the subfield of the second group G2 is a subfield of the LSB+1, and the time difference between the subfields is 10 ms, a very big difference.

When the subfield arrangement of the Korean published application No. 2000-16955 is used and error diffusion is applied to display low gray, the time difference between the subfields corresponding to the LSB and the LSB+1 is as big as several ms, and a light emission sustain time having the above-noted time difference is short. Therefore, a severe DFC can occur in a boundary of grays when an image sensed by eyes moves.

For example, FIG. 3 shows a concept diagram of a DFC that would be generated when using the disclosure of the above-noted published application, when an image moves in the case where adjacent grays are 4 and 3. As shown in FIG. 3, the DFC occurs at a total of five points when the image moves in the case adjacent grays are 4 and 3, and difference values between the highest gray 4 and a distorted gray from among original grays are respectively 2, 1, 3, 2, and 1.5 depending on the generation points. These difference values show generation intensities of the generated DFC. The distorted gray while moving the image is displayed as color distortion, and it is displayed as color distortion in the DFC pattern.

Since the PDP has high power consumption because of its driving features, an automatic power control (APC) for controlling the power consumption according to a load ratio (or an average signal level (ASL)) of a frame to be displayed is provided. The APC method controls the APC levels according to the load ratio of the input video data, and varies a number of sustain pulses for each APC level to control the power consumption to be below a predetermined level.

Following the APC method, the number of sustain pulses applied to each subfield according to the load ratio is varied. That is, the total number of sustain pulses applied to the respective groups G1 and G2 is varied according to the load ratio, and since each subfield has a number of sustain pulses of as many as luminance weights that the corresponding subfield has, the number of sustain pulses applied to each subfield is also varied.

FIGS. 4A through 4C show positions of the subfields and central positions of light emission for each APC in the conventional PDP subfield structure, FIG. 4A showing a case when the APC is the minimum, FIG. 4B showing a case when the APC is the maximum, and FIG. 4C showing a case when a time of the first group G1 is greater than that of the second group G2.

As shown in FIGS. 4A and 4B, time gaps TIME G1G2 and TIME G2G1 between the central positions of light emission of the groups G1 and G2 are the same when the APC is the minimum and the maximum, and hence, the central positions of light emission of the first and second groups G1 and G2 have periodicity in many gray regions. Therefore, the conventional PDP subfield structure generates fewer flickers.

However, as shown in FIG. 4C, when a subfield occupation time of the first group G1 is longer than that of the second group G2 in the case of forming partial gray irrespective of the APC level, the positions of the top subfields of the first and second groups that are turned on become different. Referring to FIG. 4C, the time gap TIME G1G2 between the light emission centers of the first and second groups G1 and G2 is less than the time gap TIME G2G1 between the light emission centers of the second group G2 and a next frame's first group G1, and as a result, the light emission centers of the groups G1 and G2 lose periodicity, thereby generating flicker.

SUMMARY OF THE INVENTION

In an exemplary embodiment of the present invention is provided a PDP image display method and device thereof for varying a subfield start position according to a load ratio of a video frame at the time of driving by a subfield arrangement for 50 Hz PAL video signals to substantially periodically maintain the light emission centers between subfield groups, thereby reducing flicker generation, and closely arranging the subfields corresponding to the LSB and the LSB+1 used for forming low gray in the second subfield group G2 to reduce the time difference between the subfields for forming the low gray and minimize the DFC generated when an image moves.

In one exemplary embodiment of the present invention, a PDP image display method is provided. The method includes: dividing an image of each frame displayed on a PDP corresponding to an input video signal into a plurality of subfields, each subfield corresponding to a bit that represents one of a plurality of luminance weights, the subfields including first and second subfield groups, and a number of the subfields included in the second subfield group being greater than a number of the subfields included in the first subfield group, combining the luminance weights of the subfields, and displaying gray, wherein at least one of the subfields, which is used for forming low gray, is included in the second subfield group, and wherein a start point of the second subfield group is varied according to a load ratio of the input video signal.

In another exemplary embodiment of the present invention, the second subfield group is applied after the first subfield group in each frame.

In yet another exemplary embodiment of the present invention, the luminance weights of said at least one of the subfields used for forming low gray correspond to least significant bit (LSB) and LSB+1, respectively.

In still another exemplary embodiment of the present invention, said at least one of the subfields used for forming low gray is positioned at the start point of the second subfield group.

In a further exemplary embodiment according to the present invention, the start point of the second subfield group in a first case precedes the start point of the second subfield group in a second case, where the load ratio in the first case is greater than the load ratio in the second case.

In a yet further exemplary embodiment of the present invention, an occupation time of the first subfield group includes a suspension time of the first subfield group, and varies according to the load ratio.

In a still further exemplary embodiment of the present invention, the occupation time of the first subfield group reduces as the load ratio increases.

In another exemplary embodiment of the present invention is provided a plasma display panel (PDP) image display method for dividing an image of each frame displayed on a PDP corresponding to an input video signal into a plurality of subfields, combining luminance weights of the subfields, and displaying gray. The method includes: determining whether the input video signal is a PAL signal; if the input video signal is the PAL signal: generating subfield data and address data corresponding to the input video signal; producing a number of sustain pulses based on a load ratio of the input video signal; determining a start point of each subfield; and generating a control signal for a subfield arrangement configuration based on the number of sustain pulses and the start point of each subfield; and applying the generated subfield data, the address data, and the control signal for the subfield arrangement configuration to the PDP, wherein the subfield data include first and second subfield groups, wherein a number of the subfields included in the second subfield group is greater than a number of the subfields included in the first subfield group, and wherein at least one of the subfields, which is used for forming low gray, is included in the second subfield group.

In yet another exemplary embodiment of the present invention, a PDP image display method is provided. The method includes: dividing an image of each frame displayed on a PDP corresponding to an input video signal into a plurality of subfields, each subfield corresponding to a bit that represents one of a plurality of luminance weights, the subfields including first and second groups, and a number of the subfields included in the second subfield group being greater than a number of the subfields included in the first subfield group, combining the luminance weights of the subfields, and displaying gray, wherein at least one of the subfields, which is used for forming low gray, is included in the second subfield group, and wherein light emission centers between the subfield groups are substantially periodically formed regardless of a variation of the load ratio of the input video signal.

In still another exemplary embodiment according to the present invention, the substantially periodical formation of the light emission centers between the subfield groups is realized by making a first time gap between the light emission centers of the first and second subfield groups correspond to a second time gap between the light emission centers of the second subfield group and a first subfield group of a next consecutive frame.

In a further exemplary embodiment of the present invention, a PDP image display for dividing an image of each frame displayed on a PDP corresponding to an input video signal into a plurality of subfields, combining luminance weights of the subfields, and displaying gray, includes: a video signal processor for digitizing the input video signal to generate digital video data; a vertical frequency detector for analyzing the digital video data output by the video signal processor to determine whether the input video data is an NTSC signal or a PAL signal, establishing a corresponding result as a data switch value, and outputting the data switch value together with the digital video data; a memory controller for receiving the digital video data and the data switch value, generating subfield data and address data corresponding to one of the NTSC and PAL video signals in accordance with the data switch value, and applying the subfield data and the address data to the PDP, wherein the subfield data correspond to subfields including first and second subfield groups, a number of subfields included in the second subfield group is greater than a number of subfields included in the first subfield group, and at least one of the subfields, which is used for forming low gray, is included in the second subfield group; an automatic power control (APC) unit for detecting a load ratio of the digital video data output by the vertical frequency detector, calculating an APC level according to the detected load ratio, producing a number of sustain pulses corresponding to the calculated APC level, and outputting the number of sustain pulses; a subfield variable range determination unit for determining a variable range of each subfield according to the load ratio output by the APC unit, and determining a start point of each subfield within the determined variable range; and a sustain and scan pulse driver for receiving the number of sustain pulses, and an address pulse width of each subfield, a start position of each subfield, and a data switch value output by the subfield variable range determination unit, classifying as an NTSC video signal case or a PAL video signal case according to the data switch value to generate a subfield arrangement configuration, generating a control signal based on the generated subfield arrangement, and applying the sustain pulses to the PDP.

In a further exemplary embodiment according to the present invention, a method of displaying an image corresponding to an input video signal on a plasma display panel (PDP), using a plurality of subfields, is provided. The plurality of subfields are selectively used to form gray of the image. The method includes: organizing the subfields into first and second subfield groups, each subfield corresponding to a bit that represents one of a plurality of luminance weights, the second subfield group including subfields corresponding to least significant bit (LSB) and LSB+1, respectively; and forming low gray using the subfields corresponding to the LSB and LSB+1 in the second subfield group

BRIEF DESCRIPTION OF THE DRAWINGS

The accompanying drawings, which together with the specification, illustrate exemplary embodiments of the present invention, and, together with the description, serve to explain the principles of the present invention.

FIG. 2 shows a partial realization of low gray by using a conventional subfield arrangement;

FIG. 6 shows a partial realization of low gray by using the arrangement according to the first exemplary embodiment of the present invention;

DETAILED DESCRIPTION

In the following detailed description, only certain exemplary embodiments of the present invention are shown and described, by way of illustration. As those skilled in the art would recognize, the described exemplary embodiments may be modified in various different ways, all without departing from the spirit or scope of the invention. Accordingly, the drawings and description are to be regarded as illustrative in nature, and not restrictive.

A PDP image display method in exemplary embodiments of the present invention will be described in reference to the drawings.

Figure 5:
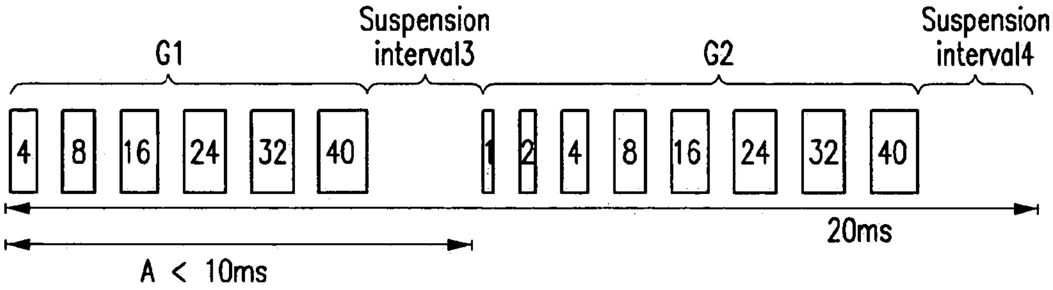
FIG. 5 shows a subfield structure according to a first exemplary embodiment of the present invention.

FIG. 5 shows a subfield structure according to a first exemplary embodiment of the present invention.

As shown in FIG. 5, a frame according to the first exemplary embodiment of the present invention includes two individual subfield groups G1 and G2, and two suspension intervals 3 and 4 respectively provided to the end of the groups G1 and G2.

The first group G1 has six subfields, and respective luminance weights of the subfields are established to be 4, 8, 16, 24, 32, and 40 from the lowest to the highest subfield, and they can be varied by a skilled person according to a usage format. The second group G2 has eight subfields, and respective luminance weights are established to be 1, 2, 4, 8, 16, 24, 32, and 40 from the lowest to the highest subfield, and they can also be varied by a skilled person according to the luminance weights of the first group G1. In this instance, the subfield arrangement of the second group G2 is formed by adding the subfields of the LSB and the LSB+1 having the luminance weights of 1 and 2, respectively, to the subfield arrangement of the first group G1 so that the subfields of the LSB and the LSB+1 may be closely provided to the subfield arrangement of the first group G1.

In this instance, the first group G1 starts at a start position of the frame, that is, 0 ms, and the total interval 'A' including the suspension interval 3 during which the APC does not operate because of the minimum load ratio is established to be less than 10 ms. Therefore, the total interval of the second group G2 including the suspension interval 4 is established to be greater than 10 ms.

FIG. 6 shows a partial realization of low gray by using the arrangement according to the first exemplary embodiment of the present invention.

As shown in FIG. 6, in the case of representing low gray, such as the low gray ranging from 1 through 11, by using the subfield arrangement according to the first exemplary embodiment, the time difference between the subfields corresponding to the luminance weights of 1 and 2, i.e., the LSB and the LSB+1, is decreased so as to be negligible.

For example, the lowest subfields SF1 and SF2 of the second group G2 are turned on in the case of low gray 3. In this instance, since the turned-on subfields SF1 and SF2 are within the second group G2, the time difference between the subfields is very small.

Since the time difference between the subfields corresponding to the LSB and the LSB+1 used for forming low gray becomes very small when the subfields are closely arranged to the start position of the second group G2, the DFC generated on the boundary of grays may be greatly reduced when an image sensed by the eyes moves.

Figure 7:
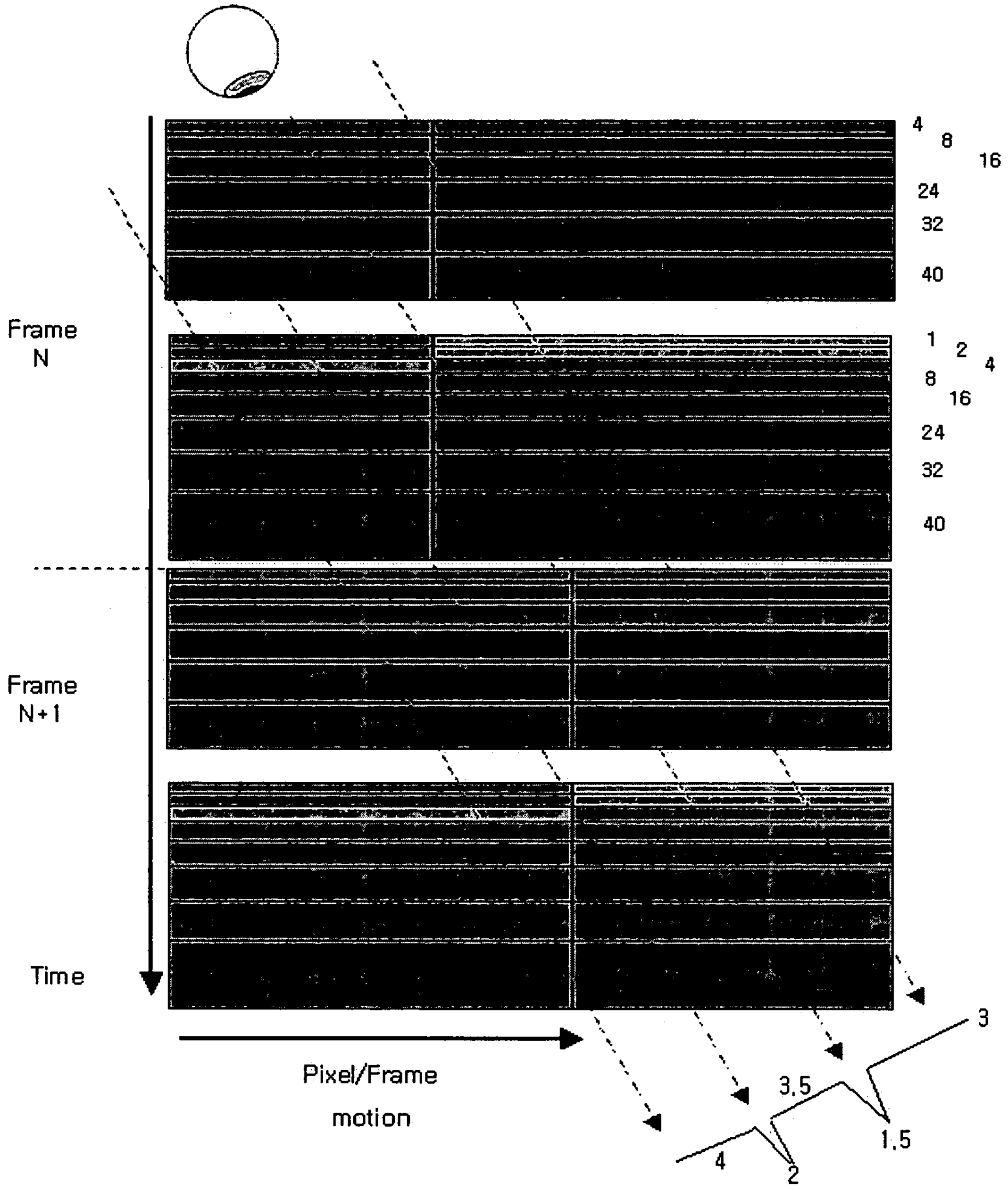
FIG. 7 shows a concept diagram of a DFC generated when an image moves in the case adjacent grays are 4 and 3 in the subfield structure according to the first exemplary embodiment of the present invention.

FIG. 7 shows a concept diagram of a DFC generated when an image moves in the case adjacent grays are 4 and 3 in the subfield structure according to the first exemplary embodiment of the present invention.

Figure 1:
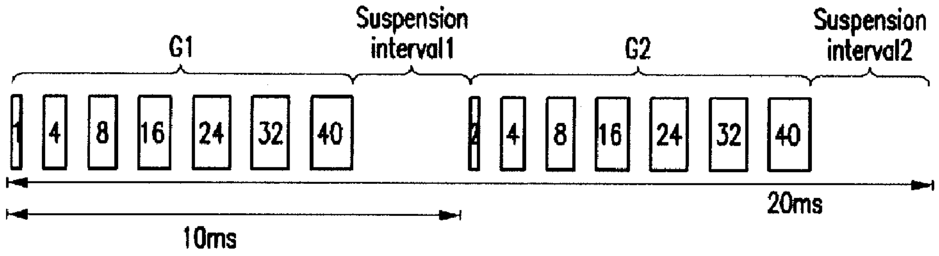
FIG.1(Prior Art)
FIG. 1 shows a conventional subfield arrangement.
Figure 3:
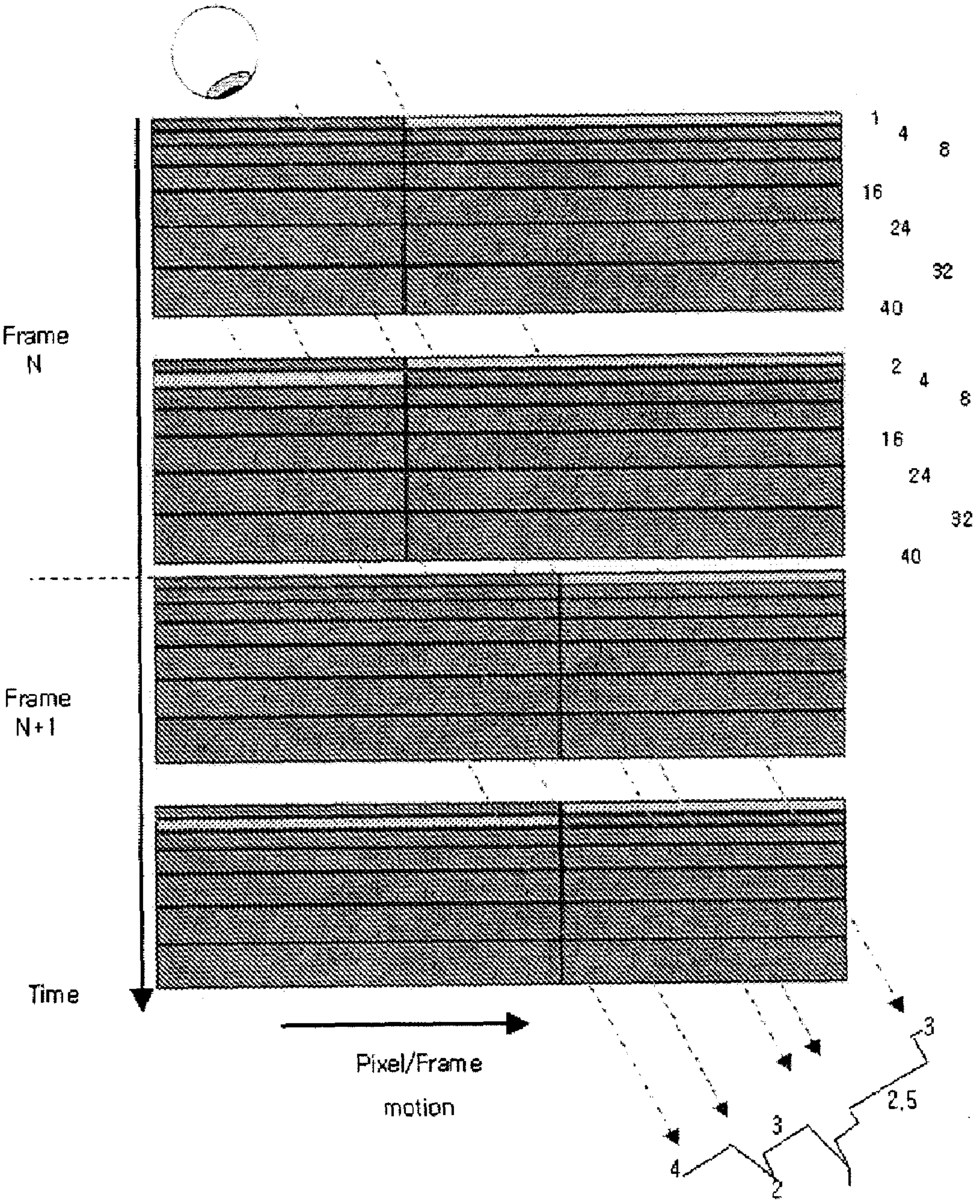
FIG.3(Prior Art)
FIG. 3 shows a concept diagram of a DFC generated when an image moves in the case where adjacent grays are 4 and 3 in the conventional subfield arrangement.
Figure 4A:
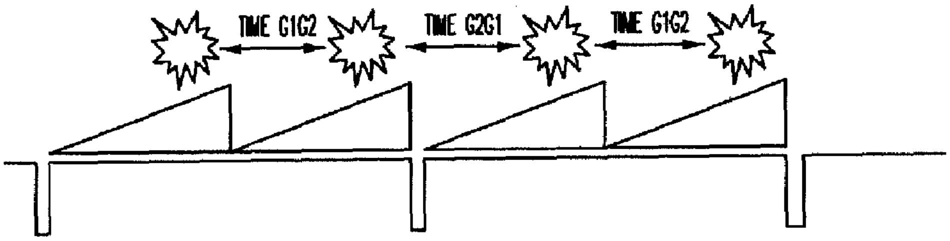
FIG.4A(Prior Art)
FIGS. 4A through 4C show positions of the subfields and central positions of light emission for each APC in the conventional PDP subfield structure, FIG. 4A showing a case when the APC is the minimum, FIG. 4B showing a case when the APC is the maximum, and FIG. 4C showing a case when a time of the first group G1 is greater than that of the second group G2.
Figure 4B:
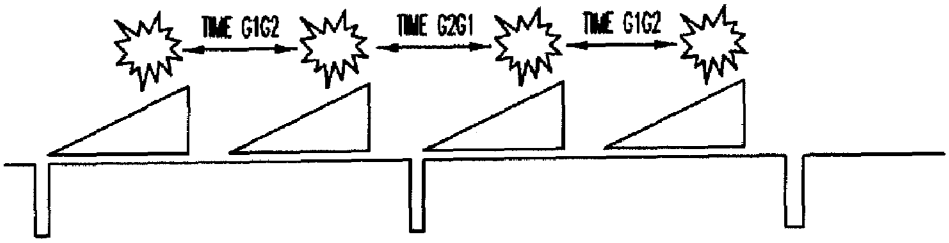
FIG.4B(Prior Art)
Figure 4C:
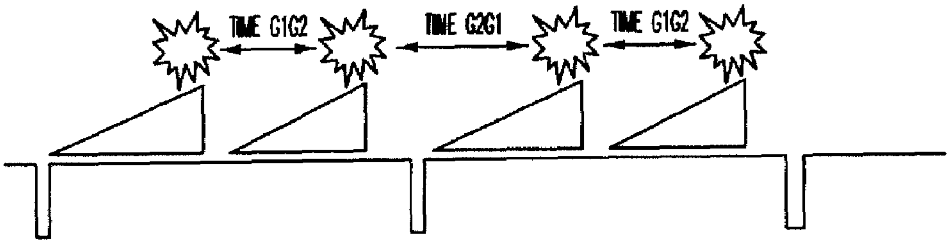
FIG.4C(Prior Art)

As shown in FIG. 7, when the adjacent grays are respectively 4 and 3 in the subfield structure according to the first exemplary embodiment, the points where the-DFC occurs when an image moves are three, and the difference values between the highest gray 4 from among the original grays and the distorted gray are respectively 2, 0.5, and 2.5 depending on generation points. From this, it can be seen that the number of DFCs is reduced compared to the case of the conventional PDP subfield structure of FIG. 3, and the difference value between the distorted gray value and the original gray is reduced to half.

Accordingly, much less DFC is generated in the subfield structure according to the first exemplary embodiment than in the conventional PDP subfield.

A subfield position and a light emission center when the APC is performed in the subfield structure according to the first exemplary embodiment will now be described.

Figure 8A:
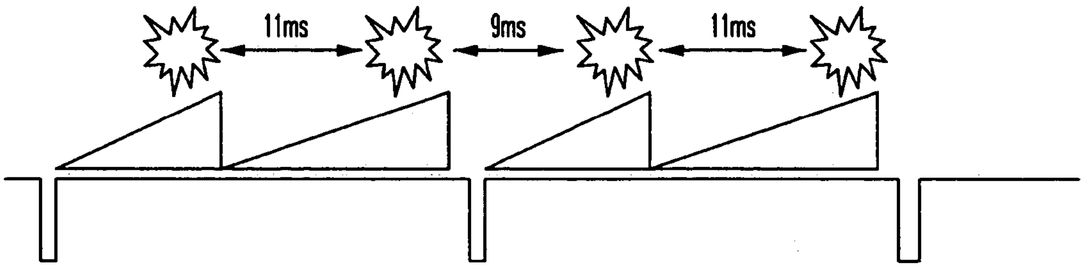
FIGS. 8A and 8B show positions of the subfields and central positions of light emission for each APC in the subfield structure shown in FIG. 5, FIG. 8A showing a case when the APC is the minimum, and FIG. 8B showing a case when the APC is the maximum.
Figure 8B:
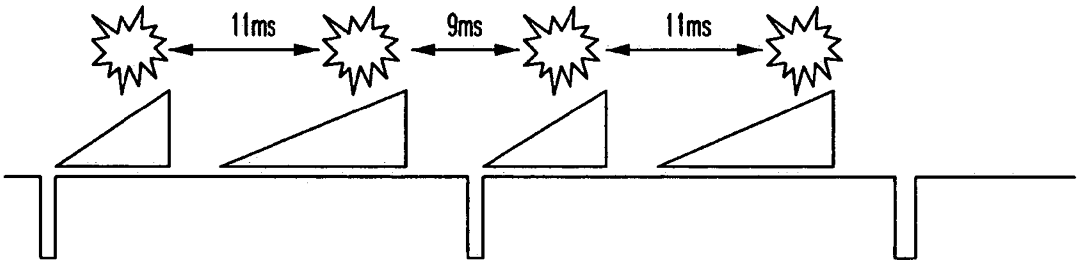

FIGS. 8A and 8B show positions of the subfields and central positions of light emission for each APC in the subfield structure shown in FIG. 5, FIG. 8A showing a case when the APC is the minimum, and FIG. 8B showing a case when the APC is the maximum.

Referring to FIGS. 8A and 8B, a gap between the position of the light emission center of the first group G1 and the position of the light emission center of the second group G2 within the identical frame, for example, is 11 ms when the APC is the minimum, and a gap between the position of the light emission center of the second group G2 and the position of the light emission center of the first group G1 of the next frame, for example, is 9 ms, which is slightly less than the above-noted interval of 11 ms.

Referring to FIG. 8B, the gap between the positions of the light emission centers of the first and second groups G1 and G2 when the APC operates or becomes the maximum compared to the case when the APC is the minimum is matched with the case when the APC shown in FIG. 8A is the minimum, and the gap between the positions of the light emission centers of the second group G2 and the first group G1 of the next frame is matched with the case when the APC of FIG. 8A is the minimum.

As described, when the APC is operated or becomes the maximum compared to the case when the APC is the minimum, the respective subfield intervals of the first and second groups G1 and G2 are reduced, and when the suspension intervals 3 and 4 are increased, the start point of the second group G2 is the same, the gap between the positions of the light emission centers of the first and second groups G1 and G2 within the same frame becomes farther, and the gap between the positions of the light emission centers of the second group G2 and the next frame's first group G1 becomes closer, and accordingly, the gap of the positions of the respective light emission centers becomes substantially the same as the case of the minimum APC irrespective of APC levels.

Hence, since the start position of the subfield is fixed with no relation to variation of the APC levels, i.e., since the start point of the second group G2 is fixed irrespective of the APC levels, the centers of the light emission of the groups G1 and G2 are non-periodically formed, thereby causing flickers.

To solve this problem, a subfield structure according to a second exemplary embodiment of the present invention will be described.

Figure 9A:
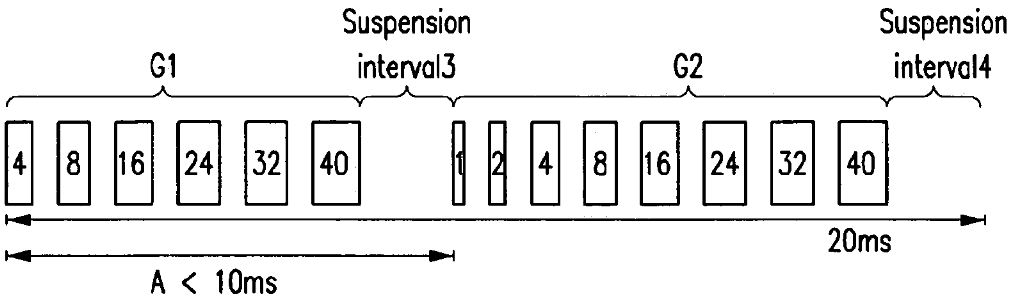
FIGS. 9A through 9C show a subfield structure according to a second exemplary embodiment of the present invention, FIG. 9A showing a case when the APC is the minimum, FIG. 9B showing a case when the APC is the intermediate, and FIG. 9C showing a case when the APC is the maximum.
Figure 9B:
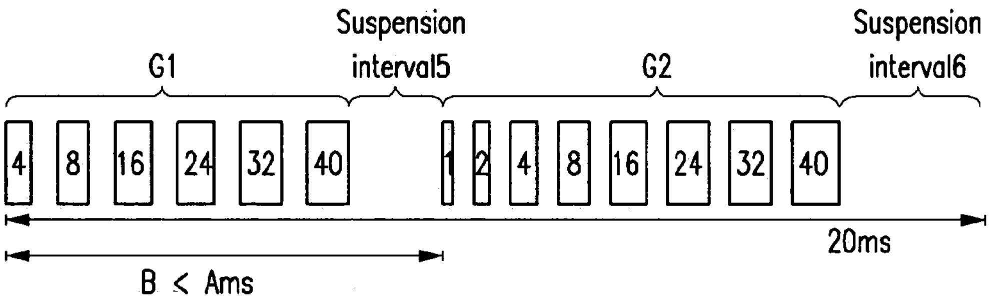
Figure 9C:
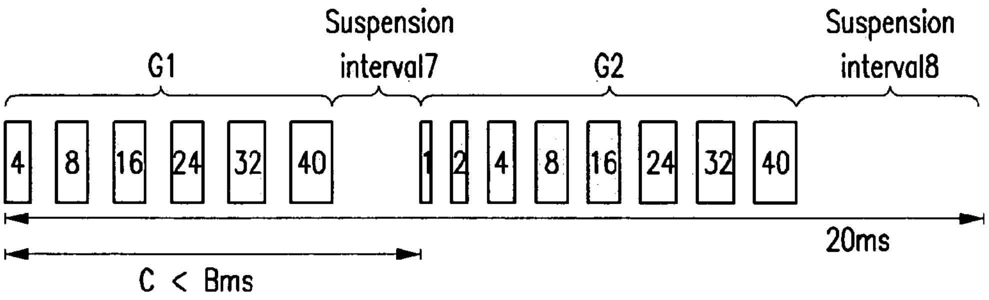

FIGS. 9A through 9C show a subfield structure according to a second exemplary embodiment of the present invention, FIG. 9A showing a case when the APC is the minimum, FIG. 9B showing a case when the APC is the intermediate, and FIG. 9C showing a case when the APC is the maximum.

As shown in FIG. 9A, in the case of the minimum APC, since the subfield structure according to the second exemplary embodiment corresponds to that of the first exemplary embodiment shown in FIG. 5, no further description will be provided.

As shown in FIG. 9B, differing from the subfield structure according to the first exemplary embodiment of FIG. 5, the interval 'B' of the first group G1 in the load ratio at which the APC operates becomes shorter than the interval 'A' of the case when the APC does not operate (i.e., B<A), and hence, the start point of the second group G2 becomes earlier than that of the subfield structure shown in FIG. 9A when the APC does not operate. In this instance, the suspension interval 5 is fixed to be matched with or slightly greater than the suspension interval 3 when the APC does not operate, and since the suspension interval 6 increases with inclusion of the increments of the suspension interval 5, it becomes much greater than the suspension interval 4 when the APC does not operate.

As shown in FIG. 9C, when the APC is the maximum with the maximum load ratio, the interval 'C' of the first group G1 also becomes the maximum to be less than the intervals 'A' and 'B' of the respective FIGS. 9A and 9B, i.e., C<B<A. However, the suspension interval 7 is fixed to be matched with or slightly greater than the suspension intervals 3 and 5 of FIGS. 9A and 9B, and the suspension interval 8 becomes greater than the previous suspension intervals 4 and 6.

Figure 10A:
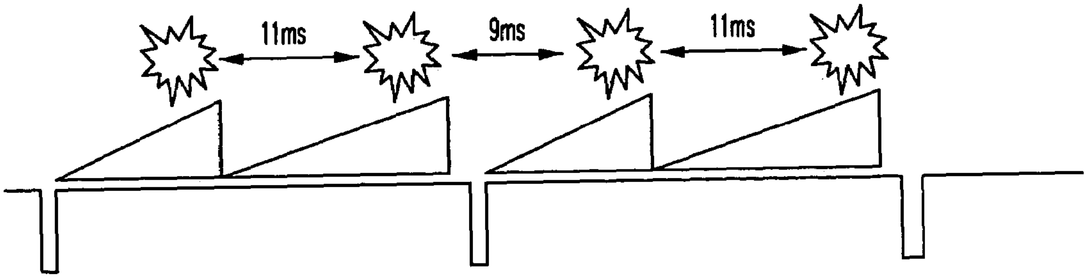
FIGS. 10A and 10B show positions of the subfields and central positions of light emission for each APC in the subfield structure shown in FIG. 9, FIG. 10A showing a case when the APC is the minimum, and FIG. 10B showing a case when the APC is the maximum.
Figure 10B:
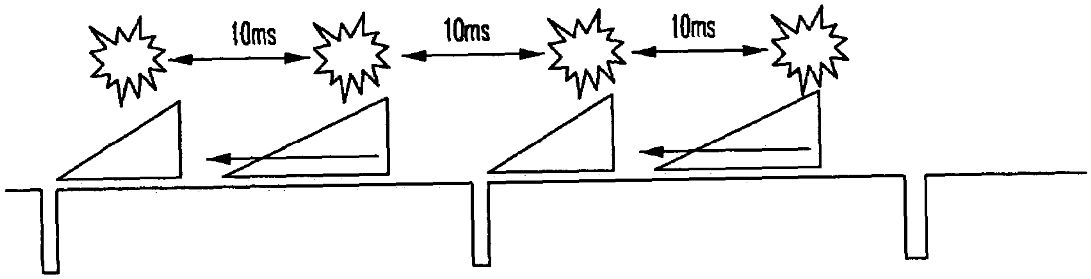

FIGS. 10A and 10B show positions of the subfields and central positions of light emission for each APC in the subfield structure shown in FIGS. 9A-C, FIG. 10A showing a case when the APC is the minimum, and FIG. 10B showing a case when the APC is the maximum.

As shown in FIGS. 10A and 10B, the subfield intervals of the first and second groups G1 and G2 are reduced, and the suspension intervals thereof are increased when the APC is the maximum compared to the case when the APC is the minimum.

In this instance, since the start point of the second group G2 is varied toward the first group G1 according to the APC levels, the gap between the positions of the light emission centers of the first and second groups G1 and G2 within the same frame becomes closer (e.g., 10 ms) than the conventional case, and the gap between the positions of the light emission centers of the second group G2 and the next frame's first group G1 becomes farther (e.g., 10 ms) than the conventional case.

As described, the gap of the positions of the light emission centers of the subfield groups G1 and G2 has substantial periodicity by varying the position of the light emission centers within the same frame or between other frames, and making each time gap substantially the same (e.g., 10 ms), thereby reducing flicker.

Therefore, the start point of the second group G2 is to be varied within a range in which the gap between the positions of the light emission centers of the first and second groups G1 and G2 is substantially the same or similar to each other.

Figure 11A:
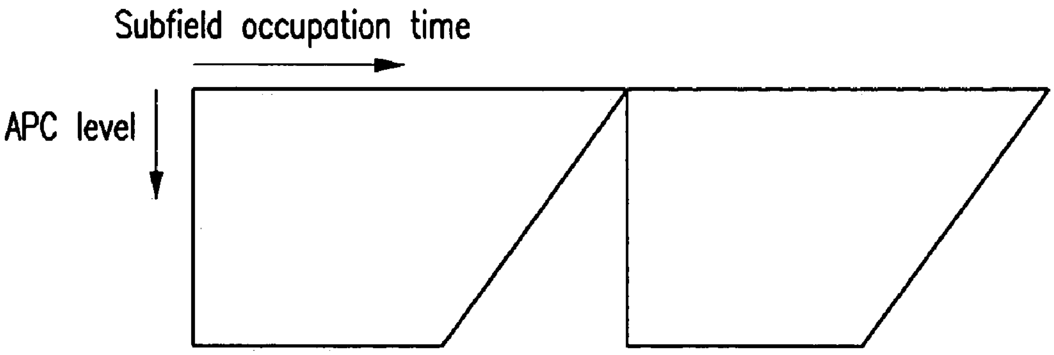
FIGS. 11A and 11B show relations between the APC level and the subfield interval (an occupation time), FIG. 11A showing a case of the subfield structure according to the first exemplary embodiment, and FIG. 11B showing a PDP subfield structure according to the second exemplary embodiment.
Figure 11B:
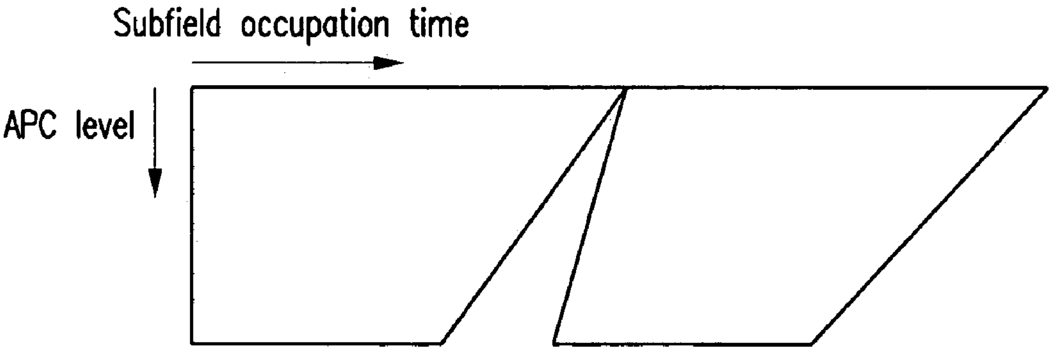

FIGS. 11A and 11B show relations between the APC level and the subfield interval (an occupation time), FIG. 11A showing a case of the subfield structure according to the first exemplary embodiment, and FIG. 11B showing a PDP subfield structure according to the second exemplary embodiment.

As shown in FIGS. 11A and 11B, the gap of the subfield interval following the APC level in the subfield structure according to the second exemplary embodiment is formed to be reduced for each group G1 and G2 because of variation of the start point of the second group G2 compared to the subfield interval following the APC level of the subfield structure according to the first exemplary embodiment, thereby reducing flicker.

Figure 12:
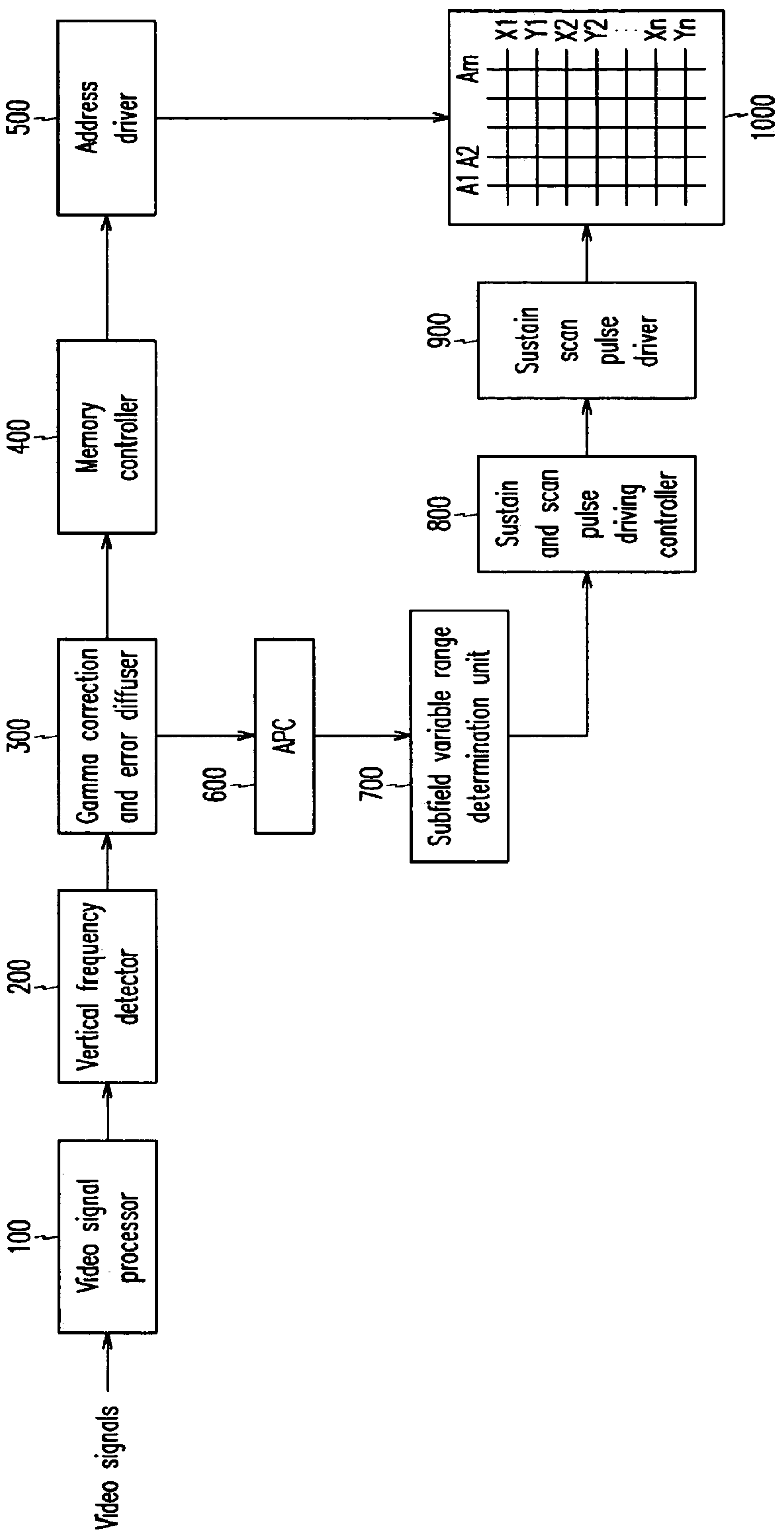
FIG. 12 shows a block diagram of a PDP image display according to an exemplary embodiment of the present invention.

FIG. 12 shows a block diagram of a PDP image display according to an exemplary embodiment of the present invention.

As shown in FIG. 12, the PDP image display includes a video signal processor 100, a vertical frequency detector 200, a gamma correction and error diffuser 300, a memory controller 400, an address driver 500, an APC unit 600, a subfield variable range determination unit 700, a sustain and scan pulse driving controller 800, and a sustain and scan pulse driver 900.

The video signal processor 100 digitizes external video signals to generate digital video signals.

The vertical frequency detector 200 analyzes the digital video signals output by the video signal processor 100 to determine whether the input video data are 60 Hz NTSC signals or 50 Hz PAL signals, establishes a corresponding result as a data switch value, and outputs the data switch value together with the digital video signals. In other embodiments, the input video data may have formats other than NTSC or PAL, such as one or more high definition television (HDTV) formats, and the video signal processor 100 is capable of distinguishing between the input video data having other formats.

The gamma correction and error diffuser 300 receives the digital video signals output by the vertical frequency detector 200, corrects a gamma value according to features of the PDP and perform spreading on display errors to adjacent pixels, and outputs results. The gamma correction and error diffuser 300 also outputs the data switch value for indicating whether the video signals output by the vertical frequency detector 200 are 50 Hz or 60 Hz video signals to the memory controller 400 and the APC unit 600.

The memory controller 400 receives the digital video data and the data switch value output by the gamma correction and error diffuser 300, and generates subfield data in accordance with the data switch value. For example, the subfield data generated for 50 Hz video signals (e.g., PAL) has a format different from the subfield data generated for 60 Hz video signals (e.g., NTSC).

When the data switch value indicates 60 Hz video signals, subfield data corresponding to the digital video data are generated following the method of generating the subfield data as a single subfield group.

However, when the data switch value indicates 50 Hz video signals, subfields are divided into two subfield groups G1 and G2 as shown in FIGS. 5 and 9A, and subfield data are generated so that the first group G1 may have six subfields and the second group G2 may have eight subfields. The subfield data are input to/output from a memory, and output to the address driver 500.

In other embodiments, the subfield data having a different configuration may be generated for input video data having formats different from NTSC or PAL, such as, for example, one or more HDTV formats.

The address driver 500 generates address data corresponding to the subfield data output by the memory controller 400, and applies the address data to address electrodes A1 through Am of the PDP 1000.

The APC unit 600 uses the video data output by the gamma correction and error diffuser 300 to detect a load ratio, calculates an APC level according to the detected load ratio, produces a number of sustain pulses corresponding to the calculated APC level, and outputs the number of sustain pulses.

The subfield variable range determination unit 700 determines a variable range of each subfield according to the load ratio output by the APC unit 800, and determines a start point of each subfield within the determined variable range.

The sustain and scan pulse driving controller 800 receives the number of sustain pulses, the start point of each subfield, and the data switch value output by the subfield variable range determination unit 700, classifies as the 50 Hz video signal case or the 60 Hz video signal case, generates each subfield arrangement configuration, and outputs the same to the sustain and scan pulse driver 900.

The sustain and scan pulse driver 900 sustains and scans pulses based on the subfield arrangement configuration output by the sustain and scan pulse driving controller 800, and applies them to the scan electrodes X1 through Xn and sustain electrodes Y1 through Yn of the PDP 1000.

According to an exemplary embodiment of the present invention, the DFC on the low gray region is greatly reduced by closely arranging the subfields used for forming low gray to the second group G2 to reduce a time difference between the subfields.

According to another exemplary embodiment of the present invention, the flicker phenomenon is reduced by substantially maintaining periodicity of the light emission centers between the subfield groups. In other words, the light emission centers of the first and second subfield groups are repeated in such a manner that a time gap between the light emission centers of the first and second subfield groups of each frame is substantially the same as a time gap between light emission centers of a second subfield group of one frame and a first subfield group of a next consecutive frame.

While the present invention has been described in connection with certain exemplary embodiments, it is to be understood that the present invention is not limited to the disclosed exemplary embodiments, but, on the contrary, is intended to cover various modifications included within the spirit and scope of the appended claims and equivalents thereof.

What is claimed is:

1. A plasma display panel (PDP) image display method comprising:

dividing an image of each frame displayed on a PDP corresponding to an input video signal into a plurality of subfields, each subfield corresponding to a bit that represents one of a plurality of luminance weights, the subfields including first and second subfield groups, and a number of the subflelds included in the second subfield group being greater than a number of the subfields included in the first subfield group;

combining the luminance weights of the subfields; and displaying gray, wherein at least one of the subfields, which is used for forming low gray, is included in the second subfield group, and wherein a start point of the second subfield group is varied according to a load ratio of the input video signal.

2. The PDP image display method of claim 1, wherein the second subfield group is applied after the first subfield group in each frame.

3. The PDP image display method of claim 1, wherein the luminance weights of said at least one of the subfields used for forming low gray correspond to least significant bit (LSB) and LSB+1, respectively.

4. The PDP image display method of claim 3, wherein said at least one of the subfields used for forming low gray is positioned at the start point of the second subfield group.

5. The PDP image display method of claim 1, wherein the start point of the second subfield group in a first case precedes the start point of the second subfield group in a second case, where the load ratio in the first case is greater than the load ratio in the second case.

6. The PDP image display method of claim 1, wherein an occupation time of the first subfield group includes a suspension time of the first subfield group, and varies according to the load ratio.

7. The PDP image display method of claim 6, wherein the occupation time of the first subfield group reduces as the load ratio increases.

8. A plasma display panel (PDP) image display method for dividing an image of each frame displayed on a PDP corresponding to an input video signal into a plurality of subfields, combining luminance weights of the subfields, and displaying gray, comprising:

determining whether the input video signal is a PAL signal;

if the input video signal is the PAL signal:

generating subfield data and address data corresponding to the input video signal;

producing a number of sustain pulses based on a load ratio of the input video signal;

determining a start point of each subfield based upon a load ratio of the input video signal; and generating a control signal for a subfield arrangement configuration based on the number of sustain pulses and the start point of each subfield; and applying the generated subfield data, the address data, and the control signal for the subfield arrangement configuration to the PDP, wherein the subfield data include first and second subfield groups, wherein a number of the subfields included in the second subfield group is greater than a number of the subfields included in the first subfield group, and wherein at least one of the subfields, which is used for forming low gray, is included in the second subfield group.

9. A plasma display panel (PDP) image display method comprising:

dividing an image of each frame displayed on a PDP corresponding to an input video signal into a plurality of subfields, each subfield corresponding to a bit that represents one of a plurality of luminance weights, the subfields including first and second subfield groups, wherein the second subfield group follows the first subfield group within the same frame, and a number of the subfields included in the second subfield group being greater than a number of the subfields included in the first subfield group;

combining the luminance weights of the subfields, and displaying gray, wherein at least one of the subfields, which is used for forming low gray, is included in the second subfield group, and wherein light emission centers between the subfield groups are substantially periodically formed regardless of a variation of the load ratio of the input video signal.

10. The PDP image display method of claim 9, wherein the substantially periodical formation of the light emission centers between the subfield groups is realized by making a first time gap between the light emission centers of the first and second subfield groups in a same frame correspond to a second time gap between the light emission centers of the second subfield group and a first subfield group of a next consecutive frame.

11. A plasma display panel (PDP) image display for dividing an image of each frame displayed on a PDP corresponding to an input video signal into a plurality of subfields, combining luminance weights of the subfields, and displaying gray, comprising:

a video signal processor for digitizing the input video signal to generate digital video data;

a vertical frequency detector for analyzing the digital video data output by the video signal processor to determine whether the input video data is an NTSC signal or a PAL signal, establishing a corresponding result as a data switch value, and outputting the data switch value together with the digital video data;

a memory controller for receiving the digital video data and the data switch value, generating subfield data and address data corresponding to one of the NTSC and PAL video signals in accordance with the data switch value, and applying the subfield data and the address data to the PDP, wherein the subfield data correspond to subfields including first and second subfield groups, a number of subfields included in the second subfield group is greater than a number of subfields included in the first subfield group, and at least one of the subfields, which is used for forming low gray, is included in the second subfield group;

an automatic power control (APC) unit for detecting a load ratio of the digital video data output by the vertical frequency detector, calculating an APC level according to the detected load ratio, producing a number of sustain pulses corresponding to the calculated APC level, and outputting the number of sustain pulses;

a subfield variable range determination unit for determining a variable range of each subfield according to the load ratio output by the APC unit, and determining a start point of each subfield within the determined variable range; and a sustain and scan pulse driver for receiving the number of sustain pulses, and an address pulse width of each subfield, a start position of each subfield, and a data switch value output by the subfield variable range determination unit, classifying as an NTSC video signal case or a PAL video signal case according to the data switch value to generate a subfield arrangement configuration, generating a control signal based on the generated subfield arrangement, and applying the sustain pulses to the PDP.

12. The PDP image display of claim 11, wherein the start point of the second subfield group in a first case precedes the start point of the second subfield group in a second case, where the load ratio in the first case is greater than the load ratio in the second case.

13. A computer readable storage medium containing a program source for implementation of a plasma display panel (PDP) image display method for dividing an image of each frame displayed on a PDP corresponding to an input video signal into a plurality of subfields, combining luminance weights of the subfields, and displaying gray, the method comprising:

determining whether the input video signal is a PAL signal;

if the input video signal is found to be a PAL signal:

generating subfield data and address data corresponding to the input video signal;

producing a number of sustain pulses based on a load ratio of the input video signal;

determining a start point of each subfield;

generating a control signal for a subfield arrangement configuration based on the number of sustain pulses and the start point of each subfield; and applying the generated subfield data, the address data, and the control signal for the subfield arrangement configuration to the PDP, wherein the subfield data include first and second subfield groups, wherein a number of subfields included in the second subfield group is greater than a number of subfields included in the first subfield group, and wherein at least one of the subfields, which is used for forming low gray, is included in the second subfield group.

14. A method of displaying an image corresponding to an input video signal on a plasma display panel (PDP), using a plurality of subfields that are selectively used to form gray of the image, the method comprising:

organizing the subfields into first and second subfield groups of a frame, wherein the second subfield group follows the first subfield group within the same frame, each subfield corresponding to a bit that represents one of a plurality of luminance weights, the second subfield group including subfields corresponding to least significant bit (LSB) and LSB+1, respectively; and forming low gray using the subfields corresponding to the LSB and LSB+1 in the second subfield group.

15. The method of claim 14, further comprising substantially maintaining a periodicity of light emission centers between the subfield groups.

16. The method of claim 14, wherein substantially maintaining the periodicity comprises varying a start time of the second subfield group according to a load ratio of the input video signal.

17. The method of claim 14, wherein the second subfield group includes a greater number of the subfields than the first subfield group.

18. The method of claim 17, further comprising organizing the subfields into a single group if the input video signal is an NTSC signal.

19. The method of claim 14, wherein a first time gap between the first and second subfield groups is substantially the same as a second time gap between the second subfield group of one frame and the first subfield group of a next consecutive frame.

20. The method of claim 14, further comprising determining whether the input video signal is a PAL signal, wherein the subfields are organized into the first and second subfield groups if the input video signal is the PAL signal.

* * * * *

UNITED STATES PATENT AND TRADEMARK OFFICE
CERTIFICATE OF CORRECTION

PATENT NO. : 7,221,335 B2
APPLICATION NO. : 10/781132
DATED : May 22, 2007
INVENTOR(S) : Jeong It is certified that error appears in the above-identified patent and that said Letters Patent is hereby corrected as shown below:

<u>In the Claims</u>

| | |
|---|---|
| Column 10, line 65, Claim 1 | Delete “subflelds”,<br>Insert --subfields-- |
| Column 11, line 1, Claim 1 | Delete “subflelds”,<br>Insert --subfields-- |
| Column 11, line 33, Claim 8 | Delete “subflelds”,<br>Insert --subfields-- |
| Column 12, line 4, Claim 9 | Delete “subflelds”,<br>Insert --subfields-- |
| Column 14, line 10, Claim 14 | Delete “subflelds”,<br>Insert --subfields-- |

Signed and Sealed this

Fifteenth Day of April, 2008

JON W. DUDAS
*Director of the United States Patent and Trademark Office*